United States Patent
Lemcoff et al.

[11] Patent Number: 5,891,217
[45] Date of Patent: Apr. 6, 1999

[54] PROCESS AND APPARATUS FOR GAS SEPARATION

[75] Inventors: Norberto O. Lemcoff, Livingston; Mario A. Fronzoni, East Brunswick, both of N.J.; Michael E. Garrett, Woking; Brian C. Green, Brockham, both of United Kingdom; Timothy D. Atkinson, Jersey City; Alberto I. La Cava, Guttenberg, both of N.J.

[73] Assignee: The BOC Group, Inc., New Providence, N.J.

[21] Appl. No.: 784,555

[22] Filed: Jan. 21, 1997

[51] Int. Cl.⁶ .................................................. B01D 53/047
[52] U.S. Cl. ......................................... 95/96; 95/98; 95/130; 95/138; 96/124; 96/130; 96/133; 96/144
[58] Field of Search ............................... 95/96–106, 138, 95/130; 96/121–124, 130, 133, 143, 144

[56] References Cited

U.S. PATENT DOCUMENTS

| Re. 35,099 | 11/1995 | Hill | 96/124 X |
|---|---|---|---|
| 2,751,032 | 6/1956 | Ringo et al. | 96/124 |
| 4,038,054 | 7/1977 | Gräff | 96/124 |
| 4,469,494 | 9/1984 | van Weenen | 96/124 |
| 4,925,464 | 5/1990 | Rabenau et al. | 96/124 |
| 5,114,441 | 5/1992 | Kanner et al. | 96/130 X |
| 5,176,722 | 1/1993 | Lemcoff et al. | 95/138 X |
| 5,248,325 | 9/1993 | Kagimoto et al. | 96/130 X |
| 5,256,174 | 10/1993 | Kai et al. | 96/124 X |
| 5,268,021 | 12/1993 | Hill et al. | 96/124 X |
| 5,366,541 | 11/1994 | Hill et al. | 96/124 |
| 5,441,559 | 8/1995 | Petit et al. | 96/144 X |
| 5,584,322 | 12/1996 | Pöschl et al. | 96/124 X |
| 5,593,478 | 1/1997 | Hill et al. | 96/124 X |
| 5,593,480 | 1/1997 | Pöschl | 96/124 |
| 5,681,376 | 10/1997 | Wooten et al. | 96/124 |

Primary Examiner—Robert Spitzer
Attorney, Agent, or Firm—Coleman R. Reap; Salvatore P. Pace

[57] ABSTRACT

A rotary valve system which includes of a pair of valve assemblies each of which has valve parts with flat faces which, when pressed together and rotated, provide valving action between various ports incorporated in one valve part of each assembly. The first valve part of each assembly contains a circular array of through openings, each of which is connected to a conduit. The second valve part of each assembly contains several passages which provide communication between various openings of the first valve part and valve apertures located in the second valve part of each assembly. The second valve part of each assembly also contains one or more passages which provide communication between members of one or the other array of openings. The valve system can be effectively used to automate operation of a gas or liquid adsorption system comprising two or more adsorption vessels, the number of vessels being equivalent to the total number of openings in either array. Use of the valve assembly in an adsorption system eliminates the need for many of the valves required in conventional multivessel adsorption systems.

37 Claims, 4 Drawing Sheets

PROCESS AND APPARATUS FOR GAS SEPARATION

FIELD OF THE INVENTION

This invention relates to the separation of gases by pressure swing adsorption (PSA), and more particularly to an adsorption system comprised of a plurality of adsorption vessels arranged in parallel and operated sequentially to provide a quasi-continuous supply of nonadsorbed gas product. Sequencing of the adsorption vessels in the production cycle is controlled by means of an assembly of rotary valves which, by rotation, controls the flow of the various gas streams to and from the adsorption vessels.

BACKGROUND OF THE INVENTION

Cyclic adsorption processes are generally practiced in batteries of adsorption vessels comprised of two or more adsorbent-filled vessels arranged in parallel and operated out of phase such that at least one vessel is in the adsorption mode while at least one other vessel is in the adsorbent regeneration mode. In each cycle of the process a series of sequential steps, including adsorption, equalization and regeneration, are carried out in each vessel. To enable the various streams to flow to and from the vessels, the feed, product, and exhaust lines must be provided with valves to permit gas flow through these lines at the appropriate time in the adsorption cycle. Furthermore, cross-connecting lines must be provided between the inlet ends of the vessels and between the outlet ends of the vessels to permit flow between the vessels during pressure equalization steps, and each cross connecting line must be equipped with a valve to control the flow of gas through these lines. All in all, each vessel of the system is provided with at least three valves, and each valve is opened and closed at least once during each cycle of the process. PSA cycles are commonly as short as one minute, accordingly each valve may be required to open and close sixty or more times each hour that the system is in operation. Not only is there considerable wear on each valve over the course of an adsorption run, but considerable energy is expended just to open and close the valves of the system during operation of the plant.

Adsorption processes are inherently batch-type processes. Nonadsorbed gas product is produced only during the adsorption step and desorbed gas product is produced only during the adsorbent regeneration step of the process. Because of this, the desired product is produced, at best, for no more than one-half of each cycle. Since it is often desirable or necessary that a continuous flow of product be available, for example when oxygen is provided for medical purposes, improvements to adsorption systems and processes which provide better product flow continuity are continually sought. Recently, efforts have been made to develop adsorption systems that operate somewhat like continuous process systems. Some of the more promising new adsorption plant designs are based on the principle of rotation. In some designs the adsorption units rotate through stationary gas zones, while in other designs the adsorption units are stationary while gas flow is sequenced through the various units of the system.

U.S. Pat. No. 4,925,464, discloses a simple rotary valve assembly for use with adsorption vessels. The assembly consists of two valve members which have respectively engaged surfaces that are relatively rotatable to provide valving action.

The valve assembly of this patent permits fluid to flow to and from the various adsorption vessels at appropriate times during the process cycle. The disclosure of this patent is incorporated herein by reference.

Useful pressure swing adsorption plant designs which incorporate rotary valves are described in U.S. Pat. Nos. 5,268,021, 5,366,541 and RE 35099, the disclosures of all of which are incorporated herein by reference. Each of these patents disclose controlling the operation of a battery of two or more adsorption vessels during a PSA process by a rotary valve which directs feed to and desorbed component from the various adsorption vessels of the system. The rotary valve described in these patents also provides for the transfer of fluid from one vessel to another during a pressure equalization step. Pressure equalization is the passage of gas from a first vessel that has just completed its adsorption step to a vented or evacuated vessel which has just completed its adsorbent regeneration step. In the above patents the flow of fluid during pressure equalization is from the higher pressure vessel via its inlet end, then through the rotary valve, then into the low pressure vessel via its inlet end. This method of bed equalization, referred to herein as "inlet to inlet equalization", is not very efficient for certain adsorption processes because less of the fractionated gas near the outlet end of the first vessel is transferred to the second vessel. The gas remaining in the first vessel is lost during the following depressurization step.

More efficient operation of adsorption system operation is achieved when other pressure equalization techniques are employed. A particularly useful pressure equalization method is that known as "inlet-to-inlet/outlet-to-outlet equalization", during which fluid flows from the high pressure vessel to the low pressure vessel by parallel flow through both the inlets and the outlets of the vessels. This technique is described in detail in U.S. Pat. No. 5,176,722, the disclosure of which is incorporated herein by reference.

There is a need for rotary valve assemblies which can enable an adsorption system to operate with adsorption cycles which include the above-described inlet-to-inlet/outlet-to-outlet pressure equalization step. This invention provides rotary valve assemblies which have these capabilities, and which enable additional steps, such as product gas flow, vessel purging and product fluid backfill to be automatically controlled without additional valves.

SUMMARY OF THE INVENTION

In its broadest aspect the invention comprises a multiple valve assembly system for providing selective flow communication between first fluid flow conduits and between second fluid flow conduits. The system comprises a first valve assembly having a first valve member ("first valve aperture disk") and a second valve member ("first valve passage disk"), and a second valve assembly having a first valve member ("second valve aperture disk") and a second valve member ("second valve passage disk"), and a drive means for causing relative rotation of the valve members of each valve assembly. The valve members of each assembly have smooth surfaces which are engaged to provide valving action. Each valve aperture disk has a set of equally spaced through apertures concentrically disposed about the common center of rotation. Each aperture of the first valve aperture disk is in fluid communication with one of the above-mentioned first fluid flow conduits, and each aperture of the second valve aperture disk is in fluid communication with one of the above-mentioned second fluid flow conduits. The first valve passage disk has at least one equalization passage means for selectively interconnecting two apertures of the first valve aperture disk and the second valve passage disk has at least one equalization passage means for selectively interconnecting two apertures of the second valve aperture disk. The drive means serves to provide relative rotation of the valve aperture disk and valve passage disk of each valve assembly to enable rotationally cycled interconnection and fluid flow between two apertures of the first valve aperture disk and between two apertures of the second valve aperture disk via the equalization passage means.

In a preferred embodiment the valve aperture disk of each valve assembly is stationary and the valve passage disk of each valve assembly is rotatable.

In another preferred embodiment the valve aperture disks of the valve assemblies contain the same number of apertures.

In one arrangement of the above aspect of the invention, the valve aperture disk of each valve assembly has two apertures, and the valve passage disk of each valve assembly has one equalization passage means for selectively interconnecting the two apertures of the respective valve aperture disk of the valve assembly.

In another arrangement, the valve aperture disk of each valve assembly has more than two apertures. In a more preferred version of this arrangement the valve passage disk of each valve assembly has two equalization passage means, each of which selectively interconnects two apertures of the respective valve aperture disk of the valve assembly. In a most preferred arrangement the valve aperture disk of each valve assembly has a total of 8, 12, 16 or 20 apertures.

In one embodiment of the invention the drive means produces continuous relative motion of the valve members, and in another embodiment it produces stepwise relative motion of the valve members.

In a preferred embodiment relative rotation of the valve members of the first and second valve assemblies is effected by a single drive means.

A second aspect of the invention is an adsorption system comprising the above-described valve system and an array of adsorption vessels each having a feed inlet end and a product outlet end, with each vessel containing an adsorbent which preferentially adsorbs one or more fluids of a fluid mixture relative to one or more other fluids of the mixture. In this aspect, each conduit of the first set of fluid flow conduits is connected to the product outlet end of one vessel of the array of adsorption vessels and each conduit of the second set of fluid flow conduits is connected to the feed inlet end of one vessel of the array of adsorption vessels.

The adsorption vessels used in the system of the invention may be straight elongate vessels or they may be U-shaped or concentric so that, for example, their inlet ends and outlet ends are adjacent or somewhat adjacent each other.

In a preferred embodiment of the second aspect, the invention is the above-described adsorption system comprising a valve assembly in which the first valve aperture disk and the second valve aperture disk each have more than two apertures, and the first valve passage disk has two equalization passage means each of which selectively interconnects two apertures of the first valve aperture disk, and the second valve passage disk has two equalization passage means each of which selectively interconnects two apertures of the second valve aperture disk.

In another preferred embodiment of the above-described adsorption system, each equalization passage means of the first valve passage disk corresponds to an equalization passage means of the second valve passage disk, and each pair of these corresponding equalization passages means provides communication between the same adsorption vessels.

In a preferred arrangement of this aspect, the centers of rotation of the first and second valve assemblies lie on the same line (center line) and the center of one of the interconnected apertures of the first valve aperture disk and the center of one of the interconnected apertures of the second valve aperture disk are located in the same radial planar vector emanating from the center line, and the center of the other of the interconnected apertures of the first valve aperture disk and the center of the other of the interconnected apertures of the second valve aperture disk are located in the same radial planar vector emanating from the center line.

In a more preferred embodiment of the above-described valve assemblies and adsorption systems, the first valve assembly has a feed inlet and an exhaust outlet and the first valve passage disk additionally at least one feed passage means for providing fluid communication between the feed inlet and one or more apertures of the first valve aperture disk and at least one exhaust passage means for providing fluid communication between one or more apertures of the first valve aperture disk and the exhaust outlet. In this embodiment, the second valve means preferably has a product outlet and the second valve passage disk preferably has at least one product passage means for providing fluid communication between the one or more apertures of the second valve aperture disk and the product outlet.

The second valve means preferably has a backfill inlet and the second valve passage disk preferably also has at least one backfill passage means for providing fluid communication between the backfill inlet and one or more apertures of the second valve aperture disk. The product outlet may serve as the backfill inlet.

In another embodiment, the second valve member preferably has a purge inlet and the second passage disk preferably additionally has at least one purge passage means for providing fluid communication between the purge inlet and one or more apertures of the second valve aperture disk.

In a preferred arrangement the centers of rotation of the first and second valve assemblies lie on the same line (center line), and each product passage means is at least partly located in the radial sector in which a feed passage means is located and each purge passage means is preferably located in the radial sector in which an exhaust passage means is located. The radial sector defining each purge passage means may have a lesser angular extent, i.e. it may be narrower, than the radial sector defining each exhaust passage means.

In the above-described adsorption systems, the equalization passage means of each valve assembly may be constructed so that it interconnects the two apertures of the second valve aperture disk before it interconnects the two apertures of the first valve aperture disk.

In another aspect, the invention is a process comprising introducing into the feed inlet of the above-described adsorption system, while the valve aperture disk and valve passage disk of each valve assembly are in relative rotation, a fluid mixture which contains a first component which is preferentially adsorbed by the adsorbent contained in the adsorption vessels relative to second component of the fluid mixture, while withdrawing through the product outlet fluid enriched in the second component and withdrawing from the exhaust outlet fluid enriched in the first component and providing inlet-to-inlet/outlet-to-outlet equalization between selected vessels of the system. The process is particularly suitable for fractionating gaseous mixtures, such as air. The adsorbed component of the air may be oxygen or it may be nitrogen.

BRIEF DESCRIPTION OF THE DRAWINGS

The invention is illustrated in the appended drawings in which.

The same or similar reference numerals are used to represent the same or similar parts in the various drawings. Valves, lines and equipment that are not necessary for an understanding of the invention have not been included in the drawings.

DETAILED DESCRIPTION OF THE INVENTION

The invention involves several aspects: rotary valve systems that can be used in various industrial processes in which a fluid is transferred from one point to another; multiple vessel adsorption systems that use these rotary valve systems; and processes for fractionating fluids using the multiple vessel adsorption systems of the invention. As used herein the term "fluid" includes both gases and liquids. The process aspect of the invention will be described in detail as it applies to the fractionation of gases, although it applies equally well to liquid fractionations.

A principal function of the valve systems of the invention is to provide inlet-to-inlet/outlet-to-outlet pressure equalization between an adsorption vessel that has just completed its adsorption step and one that has just completed its adsorbent regeneration step. The valve assemblies can, however, also control the flow of other gas streams of the system, particularly the flow of the feed stream to and the flow of exhaust gas from the various adsorption vessels of the system, or they can be used to control the flow of all streams of the adsorption system, as described below.

The invention can be more thoroughly understood from the following description, considered with the appended drawings. Turning now to the drawings, and particularly to FIGS. 1–7, illustrated therein is an adsorption system comprising two adsorption vessels, A and B, valve assembly drive means C, first rotary valve assembly D and second rotary valve assembly E. The inlet ends of vessels A and B are connected to feed lines 2a and 2b, respectively, and the outlet ends of the vessels are connected to product gas outlet lines 4a and 4b, respectively.

Valve assembly drive means C comprises drive motor 6, and drive shaft 8. Drive shaft 8 has an upper cylindrical shaft portion 10, a first rotary valve engagement portion 12, which has a square cross-section, a lower cylindrical shaft portion 14, and a second rotary valve engagement portion 16, which has a square cross-section. Lower shaft portion 14 has a smaller diameter than upper shaft portion 10. In the embodiment illustrated in FIG. 1, the diagonal cross-sectional dimension of first rotary valve engagement portion 12 is equal to or smaller than the cross-sectional diameter of upper shaft portion 10 and the diagonal cross-sectional dimension of second rotary valve engagement portion 16 is equal to or smaller than the cross-sectional diameter of lower shaft portion 14.

Figure 1:
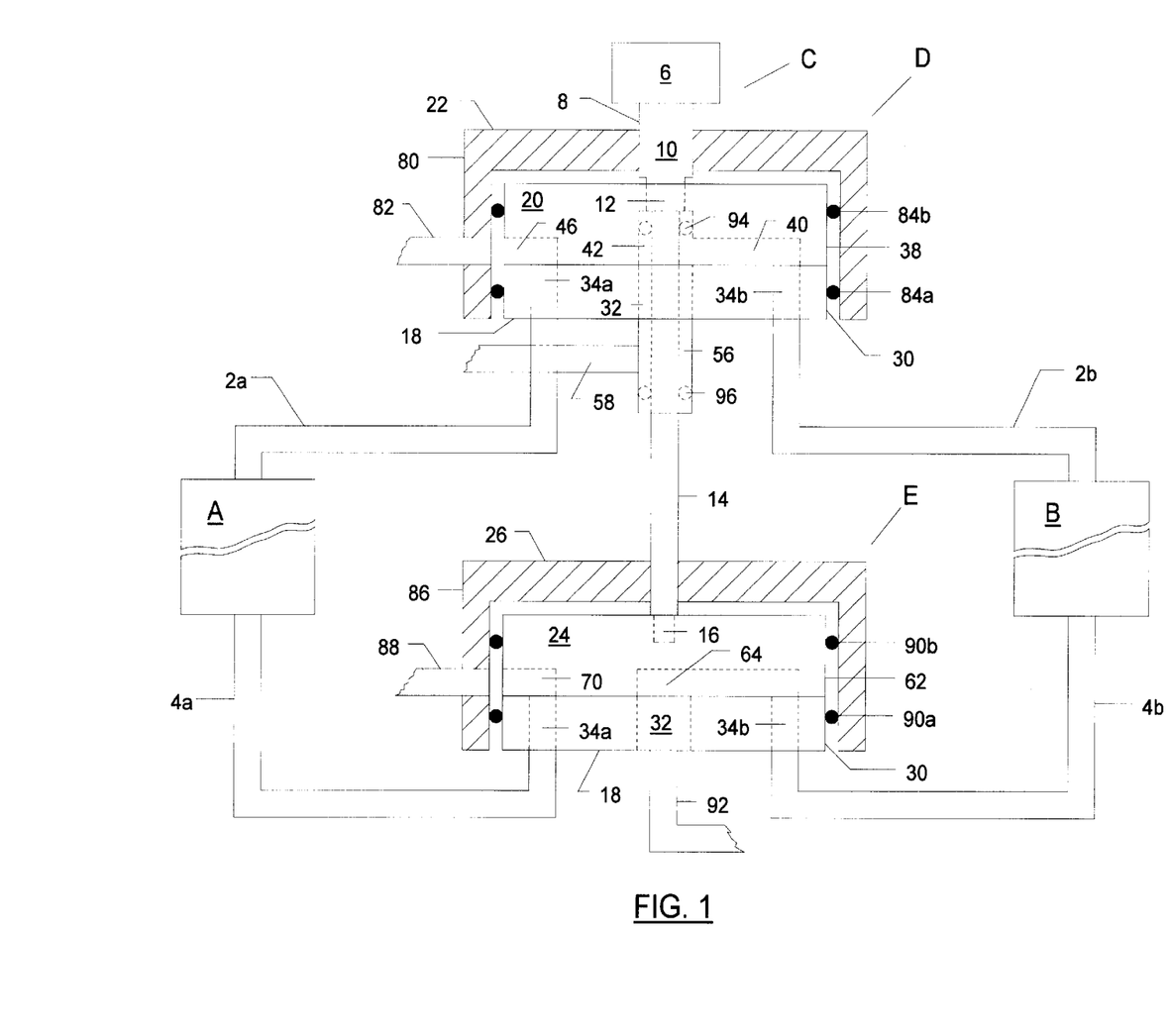
FIG. 1 is a view, partly in section, of a two vessel adsorption system incorporating the novel valve system of the invention.
Figure 2:
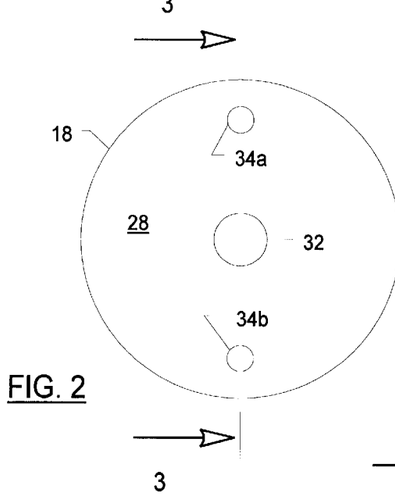
FIG. 2 is a plan view of the valve aperture disk used as both the first valve aperture disk and the second valve aperture disk of the adsorption system illustrated in FIG. 1.

Valve assembly D comprises first valve aperture disk 18, first valve passage disk 20 and valve assembly cover 22. Valve assembly E comprises second valve aperture disk 18, which is identical to valve aperture disk 18 of valve assembly D, second valve passage disk 24 and second valve assembly cover 26.

In the embodiment illustrated in FIGS. 1–7, each valve aperture disk 18, valve passage disk 20 and valve passage disk 24 are shown as circular in construction, although they may be shaped otherwise, for example polygonal, and these parts are preferably made from a durable material such as ceramic, which can be ground to a highly polished flat finish to enable the faces of the disks to form a fluid-tight seal when pressed together.

Figure 3:
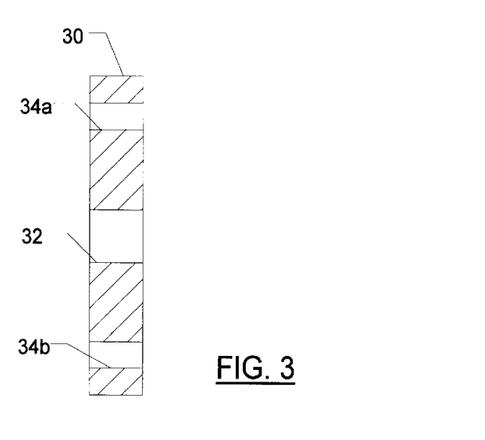
FIG. 3 is a cross-sectional view of the valve aperture disk of FIG. 2, taken along the line 3—3.

Each valve aperture disk 18 has highly polished flat circular engagement surface 28, smooth cylindrical sidewall 30, feed/product opening 32 and apertures 34a, 34b. The centers of apertures 34a and 34b are the same radial distance from the geometric center of surface 28. Opening 32 and apertures 34a, 34b are on the same diameter line through the geometric center of circular surface 28, and they extend completely through disks 18 in a direction perpendicular to surface 28 (FIG. 3). Apertures 34a, 34b are shown as being the same size in valve assemblies C and D, although the size of the apertures in valve assembly C can differ from the size of the apertures in valve assembly D. Apertures 34a and 34b of the same valve aperture disk 18 are the same size, however.

Figures 4, 5:
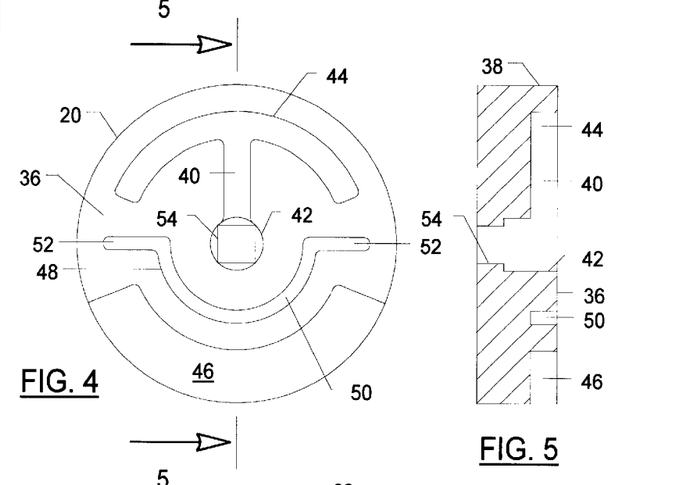
FIG. 4 is a plan view of the first valve passage disk used in the adsorption system illustrated in FIG. 1, taken along the line 4—4 of FIG. 1.
FIG. 5 is a cross-sectional view of the first valve passage disk illustrated in FIG. 4, taken along the line 5—5.

Valve passage disk 20, which has a highly polished smooth circular engagement surface 36 and a smooth sidewall 38, has several arcuate passages or channels cut into surface 36, each of which has as its center of rotation the geometric center of circular surface 36 (FIGS. 4 and 5). These include optional feed distributor 40, which has a center circular portion 42 and an arcuate passage 44; optional arcuate exhaust passage 46, and blind equalization passage 48, which has an arcuate portion 50 and end portions 52. Center circular portion 42 of feed distributor 40 extends deeper into disk 20 than do the other portions of distributor 40 (see FIG. 5). When disk 20 is placed on top of disk 18 in such a manner that surface 28 of disk 18 engages surface 36 of disk 20 with their geometric centers coinciding, at least part of arcuate passages 44 and 46 and part of end portions 52 of equalization passage 48 coincide with the annulus in which apertures 34a and 34b are located, and they come into registration with these apertures upon rotation of disk 20.

Cut into the surface of disk 20 opposite surface 36 is recess 54 which has a square cross-section into which snugly fits first rotary valve engagement portion 12 of drive shaft 8.

Fastened to the bottom of valve aperture disk 18 of valve assembly D in sealed relationship is sleeve 56, which has a hollow cylindrical portion that coincides with opening 32 of disk 18. Feed line 58 is attached to and extends through the sidewall of sleeve 56 to provide fluid communication between the feed line 58 and the hollow interior of sleeve 56.

Figure 6:
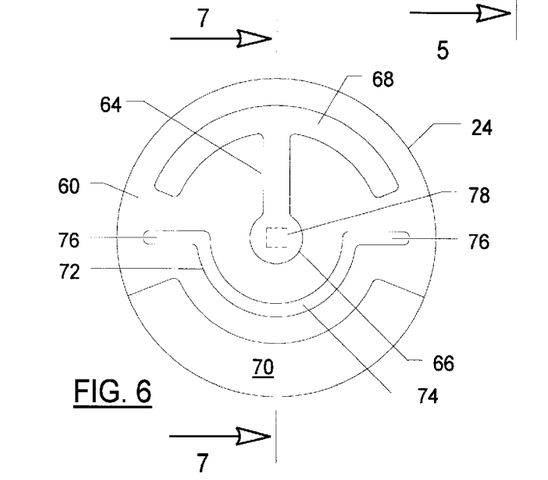
FIG. 6 is a plan view of the second valve passage disk used in the adsorption system illustrated in FIG. 1, taken along the line 6—6.
Figure 7:
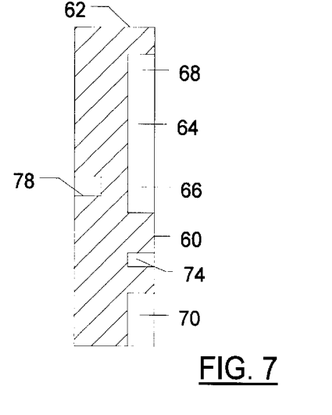
FIG. 7 is a cross-sectional view of the second valve passage disk of FIG. 6, taken along the line 7—7.
Figure 8:
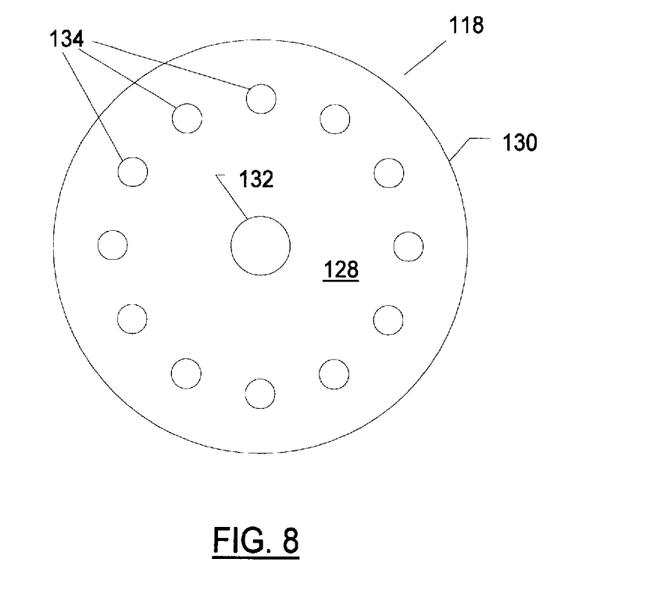
FIG. 8 is a plan view of a valve aperture disk useable as both the first valve aperture disk and the second valve aperture disk of a twelve vessel adsorption system.

Valve passage disk 24, which likewise has a highly polished smooth circular engagement surface 60 and a smooth sidewall 62, has several arcuate passages or channels cut into surface 60, each of which has as its center of rotation the geometric center of circular surface 60 (FIGS. 6 and 7). These include optional blind product collector 64, which has a center circular portion 66 and an arcuate passage 68; optional arcuate purge passage 70 and blind equalization passage 72, which has an arcuate portion 74 and end portions 76. When disk 24 is placed on top of disk 18 in such a manner that surface 28 of disk 18 engages surface 60 of disk 24 with their geometric centers coinciding, at least part of arcuate passages 68 and 70 and part of end portions 76 of equalization passage 72 coincide with the annulus in which apertures 34a and 34b are located, and they come into registration with these apertures upon rotation of disk 24.

Cut into the surface of disk 24 opposite surface 60 is blind recess 78. Recess 78 has a square cross-section into which snugly fits second rotary valve engagement portion 16 of drive shaft 8.

In the embodiments illustrated in the drawings, valve passage members 20 and 24 are designed for use in valve assemblies in which members 20 and 24 rotate in a clockwise direction, as viewed in FIGS. 4 and 6.

Returning to FIG. 1, valve assembly cover 22 of valve assembly D has a cylindrical sidewall 80 and is provided with exhaust line 82, which, in the illustrated embodiment, extends through sidewall 80. The inside diameter of sidewall 80 is somewhat greater than the outside diameters of valve disks 18 and 20. Positioned between the inside surface of sidewall 80 and disks 18 and 20 are resilient annular seal rings 84a and 84b, which form fluid-tight seals between the inside surface of sidewall 80 and the sidewalls of disks 18 and 20. These seal rings, together with disk sidewalls 30 and 38 and the inside wall of sidewall 80, form an annular channel around disks 18 and 20 through which fluids can pass. Line 82 and passage 46 communicate with the annular channel between seal rings 84a and 84b.

Similarly, valve assembly cover 26 of valve assembly E has a cylindrical sidewall 86 and is provided with purge gas supply line 88, which extends through sidewall 86. The inside diameter of sidewall 86 is somewhat greater than the outside diameters of valve disks 18 and 24. Positioned between the inside surface of sidewall 86 and disks 18 and 24 are resilient annular seal rings 90a and 90b, which form fluid-tight seals between the inside surface of sidewall 86 and sidewalls 30 and 62 of disks 18 and 24. These seal rings, together with sidewalls 30 and 62 and the inside wall of sidewall 86, form an annular channel around disks 18 and 24 through which fluids can pass. Line 88 and passage 70 communicate with the annular channel between seal rings 90a and 90b.

Product line 92 is attached in sealed relationship to the bottom surface of valve aperture disk 18 of valve assembly E in such a manner that fluid communication is established between line 92 and opening 32 of disk 18.

In each valve assembly of the invention the valve aperture disk and the valve passage disk are pressed tightly together so that no leakage of fluid occurs between the engaged polished surfaces of the valve disks. This can be accomplished, for example, by means of a spring or by means of fluid pressure, as described in above-mentioned U.S. Pat. Nos. 5,268,021, 5,366,541 and RE 35099.

When assembled, upper cylindrical portion 10 of drive shaft 8 extends through the top wall of valve assembly cover 22 in non-binding relationship; square portion 12 of shaft 8 fits snugly into recess 54 of disk 20; lower cylindrical portion 14 of shaft 8 passes in non-binding relationship through disk 18 of valve assembly D, through sleeve 56 and through the top wall of valve assembly cover 26; and square portion 16 of shaft 8 fits snugly into recess 78 of disk 24. Annular seal ring 94 is fitted into the recessed part of center circular portion 42, and annular seal ring 96 is fitted into sleeve 56 below the point at which the lower edge of line 58 extends through sleeve 56. These seal rings, together with the cylindrical wall of lower portion 14, the wall of center circular opening 42 and the inner wall of sleeve 56 form a sealed annular passage through which feed fluid can pass. This annular passage is in fluid communication with feed line 58 and distributor 40.

In the arrangement of FIG. 1, feed lines 2a and 2b are connected in a fluid-tight relationship to the lower ends of openings 34a and 34b, respectively, of valve aperture disk 18 of valve assembly D and product outlet lines 4a and 4b are connected to the lower ends of openings 34a and 34b, respectively, of valve aperture disk 18 of valve assembly E. All of these connections are fluid-tight.

Motor 6 is connected to a source of electric power and has a control mechanism (not shown) for controlling the direction and speed of rotation of shaft 8. As drive shaft 8 rotates, it causes valve passage disks 20 and 24 to rotate at the same angular velocity and cycle adsorption vessels A and B through the various steps of the adsorption process. In the valve assembly of FIG. 1, disks 18 and 20 of valve assembly D and disks 18 and 24 of valve assembly E are arranged so that the geometric centers of circular surfaces 28 (of each disk 18), of circular surface 36 and of circular surface 60 lie on the same line, and this line (centerline) serves as the center of rotation of valve passage disks 20 and 24. Motor 6 can impart continuous or stepwise rotation to valve disks 20 and 24 around the centerline. In stepwise rotation the steps may coincide with the angular distance between the centers of adjacent openings in the ring arrays, which in the embodiment of FIGS. 1–7 is 180°; or it may be of some lesser angular extent such that the angular distance between the centers of adjacent openings of the ring arrays is an exact multiple of the angular extent of each step of rotation.

Practice of the process of the invention in the system of FIG. 1 will be described as it applies to the fractionation of air with adsorption vessels A and B being packed with a particulate adsorbent which preferentially adsorbs oxygen relative to nitrogen, so that nitrogen is produced as the nonadsorbed product gas. An adsorbent such as carbon molecular sieve will provide this effect when the adsorption process is carried out on a kinetic basis. The process is described with valve passage members 20 and 24 rotating in the valve assemblies in a clockwise direction, as viewed in FIGS. 4 and 6.

At the beginning of the process arcuate passages 44 and 46 are in registration with the top ends of openings 34b and 34a, respectively, of valve disk 18 of valve assembly D, and arcuate passages 68 and 70 are in registration with the top ends of openings 34b and 34a, respectively, of valve disk 18 of valve assembly E. In this mode, adsorption vessel B is in the adsorption stage and adsorption vessel A is in the adsorbent regeneration stage of the adsorption process. Thus, feed air which preferably has been prepurified to remove water vapor and carbon dioxide and filtered to remove solid impurities is fed at the desired pressure through line 58, opening 32 of valve aperture disk 18 of valve assembly D, feed distributor 40, aperture 34b of disk 18 and line 2b, and into vessel B. As the air passes downwardly through vessel B, oxygen is preferentially adsorbed by the adsorbent in the adsorber and nitrogen-enriched gas passes out of the bottom of vessel B through line 4b. The nitrogen-enriched gas passes through opening 34b of disk 18 of valve assembly E, arcuate product collector 64 and opening 32 of disk 18, exits the system through product line 92, and is sent to product storage or to a use application.

Also, at the start of the process the adsorbent in vessel A is undergoing regeneration. This is effected by depressurizing vessel A by venting gas contained in this vessel countercurrently (in the direction opposite the direction that feed gas passes through the adsorption vessel) from this vessel through line 2a. The vent gas passes through opening 34a of disk 18 of valve assembly D and arcuate passage 46 and enters the annular space defined by outer surfaces 30 and 38 of disks 18 and 20, respectively, the inside surface of sidewall 80 of cover 22 and seal rings 84a and 84b. The vented gas then exits the system via line 82 and is vented to the atmosphere, or is otherwise used or disposed of. Adsorbent regeneration may be carried out by simply evacuating vessel A, or it may be assisted by purging vessel A with a gas that is lean in the adsorbed component, for example the nitrogen enriched product gas produced in vessel B during the adsorption process. If a purge step is to be included in the process, the selected purge gas is introduced into the system through line 88 and it enters the annular space defined by the inside surface of sidewall 86, surfaces 30 and 62 of disks 18 and 24, respectively, and seal rings 90a and 90b. The purge gas passes through passage 70, aperture 34a of disk 18 and line 4a, and flows countercurrently through vessel A. As it does so it flushes adsorbed oxygen from vessel A. The purged exhaust, and possibly some purge gas, pass out of the system through line 82.

As the process continues, drive shaft 8 continuously rotates in the selected direction, for example clockwise as viewed in FIGS. 4 and 6. During this period the adsorbed gas front in vessel B advances towards the product outlet end of this vessel. The velocity of rotation is set such that the trailing edges of passages 44 and 46 will pass out of registration with openings 34b and 34a, respectively, of disk 18 of valve assembly D at the exact time when the adsorption front reaches the desired end point of the adsorption step. Simultaneously, the trailing edges of passages 68 and 70 will pass out of registration with openings 34b and 34a, respectively, of disk 18 of valve assembly E. After these passages pass out of registration with the respective openings, the adsorption step in vessel B and the bed regeneration step in vessel A are finished for the current cycle.

Figure 13:
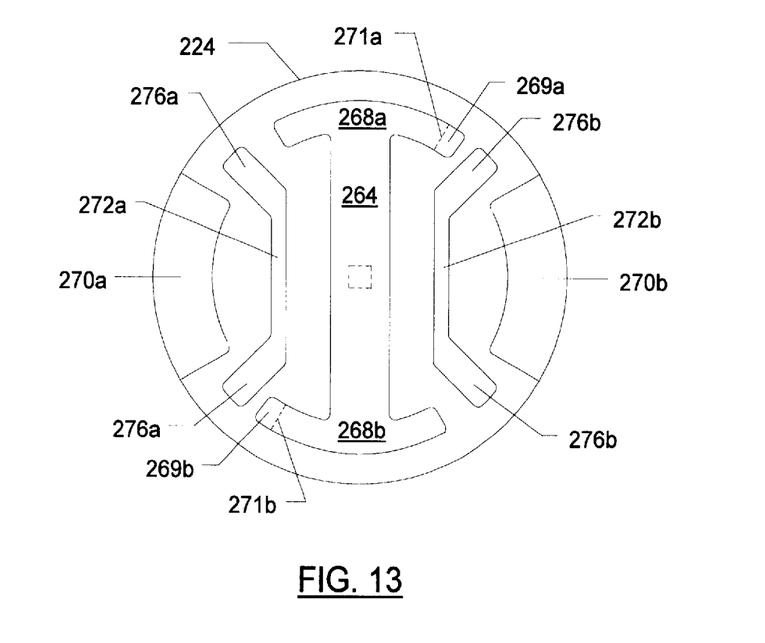
FIG. 13 is a plan view of a modified version of the valve passage disk of FIG. 11.

As rotation of valve disks 20 and 24 continues, end portions 52 of equalization passage 50 will come into registration with openings 34a and 34b of disk 18 of valve assembly E, and end portions 76 of equalization passage 72 will come into registration with openings 34a and 34b of disk 18. This may occur simultaneously or, as described below, the end portions 76 of equalization passage 72 may come into registration with openings 34a and 34b of disk 18 of valve assembly E before the portions 52 of equalization passage 50 comes into registration with openings 34a and 34b of disk 18 of valve assembly D. At this point gas will flow from vessel B, through line 4b, opening 34b of disk 18 of valve assembly E, equalization passage 74, opening 34a of disk 18, line 4a and into vessel A. Simultaneously, gas will flow from vessel B, through line 2b, opening 34b of disk 18 of valve assembly D, equalization passage 50, opening 34a of disk 18 of valve assembly D, line 2a and into vessel A. Thus, gas from the outlet end of vessel B will flow into the outlet end of vessel A and gas from the inlet end of vessel B will flow into the inlet end of vessel A, thereby effecting inlet-to-inlet/outlet-to-outlet pressure equalization. Accordingly, the gas from vessel B which is most enriched in nitrogen will enter the product end of vessel A and the gas from vessel B that has substantially the same composition as the feed gas will enter the inlet end of vessel A, thus making the process highly efficient. The bed equalization step can be allowed to continue until the pressure in the two vessels reaches equilibrium or for any shorter period of time. The time extent of the equalization step is determined by the velocity of rotation and by the width of end portions 52 and 76, respectively, of equalization passages 50 and 74. End portions 52 can be as narrow or as wide as desired, within the limits set by the distance between the trailing and leading edges, respectively, of passages 44 and 46, and end portions 76 can be as narrow or as wide as desired, within the limits set by the distance between the trailing and leading edges, respectively, of passages 68 and 70. If desired, end portions 76 can be made wider than end portions 52 so that outlet-to-outlet gas equalization will begin before inlet-to-inlet equalization, which will allow more nitrogen-enriched gas to pass to the product end of the vessel that will shortly begin its adsorption step than would otherwise occur. This feature is illustrated in FIG. 13 and will be discussed in more detail below.

As valve disks 20 and 24 continue to rotate, end portions 52 of equalization passage 50 will pass out of registration with openings 34a and 34b of disk 18 of valve assembly D and end portions 76 of equalization passage 74 will pass out of registration with openings 34a and 34b of disk 18 of valve assembly E. This marks the end of the pressure equalization step.

Upon further clockwise rotation of disks 20 and 24, the various passages come into registration with corresponding openings of disks 18 of valve assemblies D and E to cause vessel A to enter the adsorption mode and vessel B to enter the adsorbent regeneration mode. During this period arcuate passages 44 and 46 will be in registration with openings 34a and 34b of disk 18 of valve assembly D, respectively, and arcuate passages 68 and 70 will be in registration with openings 34a and 34b of disk 18 of valve assembly E, respectively. This stage of the process will be the same as the above-described adsorption step and adsorbent regeneration step except that valve disks 20 and 24 will be advanced 180°.

Upon further clockwise rotation of disks 20 and 24, passages 44 and 46 will eventually come out of registration with openings 34a and 34b, respectively, of disk 18 of valve assembly D, and passages 68 and 70 will eventually come out of registration with openings 34a and 34b, respectively of disk 18 of valve assembly E, which event marks the end of the second adsorption-regeneration step of the cycle. As disks 20 and 24 continue to rotate clockwise end portions 52 and 76 will come into registration with openings 34a and 34b of disk 18 of valve assembly D and openings 34a and 34b of disk 18 of valve assembly E, respectively. This will initiate inlet-to-inlet/outlet-to-outlet pressure equalization with gas flowing from vessel A to vessel B. This step will continue until end portions 52 and 76 come out of registration with openings 34a and 34b of disk 18 of valve assembly D and 34a and 34b of disk 18 of valve assembly E, respectively. This will mark the end of the second pressure equalization step of the process and the end of the first cycle. Disks 20 and 24 will continue to rotate and cycle adsorbers A and B through each cycle of the process until the adsorption run ends.

It is not necessary that the feed and vent gases pass through valve assembly D or that the product and purge gases pass through valve assembly E in the sense that, if desired, these gases can be introduced into and removed from the system through other lines connected directly to lines 2a, 2b, 4a and 4b, respectively (not shown).

FIGS. 8–12 illustrate the construction of a valve aperture disk and valve passage disks that are intended for use in the multiple vessel embodiment of the invention. Valve aperture disk 118 and valve passage disks 120 and 124 are likewise shown as circular in construction, although they may have other shapes. As in the embodiment illustrated by FIGS. 1–7, valve aperture disk 118 and valve passage disks 120 and 124 are preferably made of a durable material such as ceramic, which can be ground to a highly polished flat finish to enable the faces of the disks to form a fluid-tight seal when pressed together.

Valve aperture disk 118, which is designed for use with either valve passage disk 120 or valve passage disk 124 (described below) has a highly polished flat circular engagement surface 128; a smooth cylindrical sidewall 130 (like sidewall 30 of disk 18, FIG. 3); a feed inlet/product outlet opening 132; and an array of twelve equally spaced apertures 134. Apertures 134 lie in the same ring array, i.e. their centers are all the same radial distance from the geometric center of surface 128. Opening 132 and apertures 134 extend completely through disk 118 in a direction perpendicular to surface 128 (as in valve aperture disk 18, FIG. 3). All apertures on a single disk 118 are the same size, but apertures of disks 118 intended for use with valve passage disk 120 may be the same size as, or larger or smaller than the apertures of disks 118 intended for use with valve passage disk 124

Figure 9:
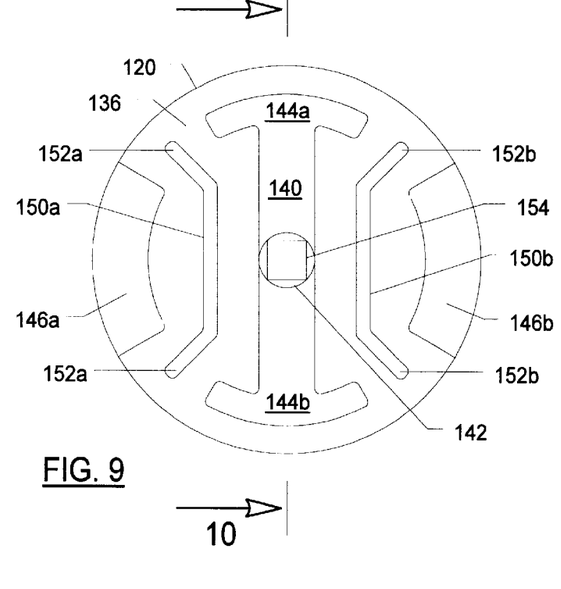
FIG. 9 is a plan view of a first valve passage disk designed for use with the valve aperture disk of FIG. 8.
Figure 10:
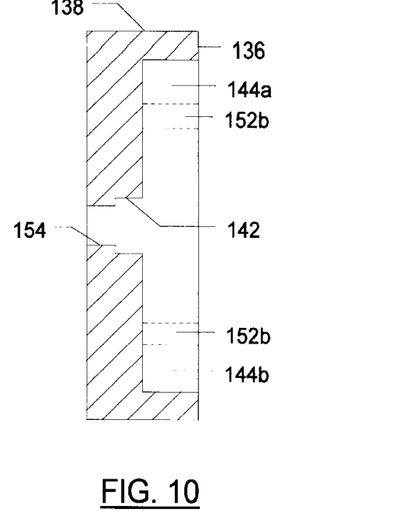
FIG. 10 is a cross-sectional view of the valve passage disk of FIG. 9, taken along the line 10—10.

As can be seen in FIGS. 9 and 10, valve passage disk 120, which likewise has a highly polished smooth engagement surface 136, and a smooth sidewall 138, has several arcuate passages or channels, each of which has as its center of rotation the geometric center of surface 136. Disk 120 has optional feed distributor 140 with recessed center portion 142 and diametrically opposed arcuate passages 144a and 144b; optional diametrically opposed arcuate exhaust passages 146a and 146b; and diametrically opposed blind equalization passages 150a and 150b, which have end portions 152a and 152b, respectively. Recessed center portion 142 of feed distributor 140 extends deeper into disk 120 than does the remaining portions of distributor 140 (see FIG. 10). When disk 120 is placed on top of disk 118 in such a manner that surface 128 of disk 118 engages surface 136 of disk 120 with their geometric centers coinciding, at least part of arcuate passages 144a, 144b, 146a and 146b and part of end portions 152a and 152b of equalization passages 150a and 150b, respectively, coincide with the annulus in which apertures 134 are located, and they come into registration with these apertures upon rotation of disk 120.

Cut into the surface of disk 120 opposite surface 136 is recess 154. Recess 154 has a square cross-section into which snugly fits first rotary valve engagement portion 12 of drive shaft 8 to enable disk 120 to be rotated over surface 128 of valve member 118 (FIG. 1).

Figure 11:
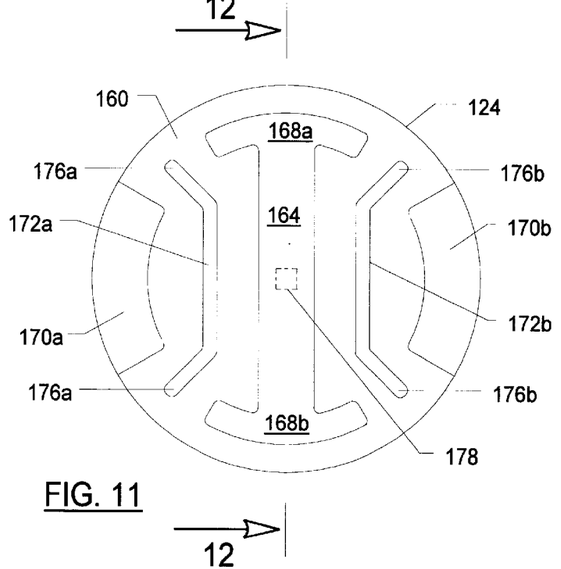
FIG. 11 is a plan view of a second valve passage disk designed for use with the valve aperture disk of FIG. 8.
Figure 12:
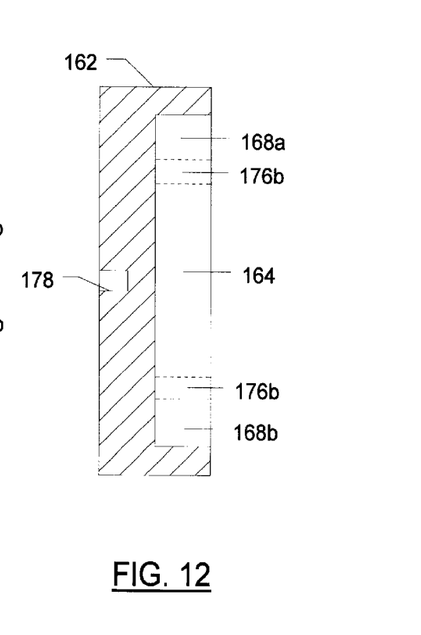
FIG. 12 is a cross-sectional view of the valve passage disk of FIG. 11, taken along the line 12—12.

As illustrated in FIGS. 11 and 12, valve passage disk 124, which has a highly polished smooth circular engagement surface 160 and a smooth sidewall 162, has several arcuate passages or channels cut into surface 160, each of which has as its center of rotation the geometric center of circular surface 160. These include optional product collector 164 which has a pair of diametrically opposed arcuate product passages 168a and 168b; optional arcuate purge passages 170a and 170b; and diametrically opposed blind equalization passages 172a and 172b, which have end portions 176a and 176b, respectively. Product collector 164, purge passages 170a and 170b and equalization passages 172a and 172b are constructed substantially the same as feed distributor 140, exhaust passages 146a and 146b, and equalization passages 150a and 150b, respectively. When disk 124 is placed on top of disk 118 in such a manner that surface 128 of disk 118 engages surface 160 of disk 124 with their geometric centers coinciding, at least part of arcuate passages 168a, 168b, 170a and 170b, and part of end portions 176a and 176b of equalization passage 172a and 172b, respectively, coincide with the annulus in which apertures 134 are located, and they come into registration with these apertures upon rotation of disk 124.

Cut into the surface of disk 124 opposite surface 160 is blind recess 178, which has a square cross-section into which snugly fits second rotary valve engagement portion 16 of drive shaft 8 to enable disk 124 to be rotated over surface 128 of valve member 118 (see FIG. 1).

A valve aperture disk 118 and valve passage disk 120 are designed to replace valve aperture disk 18 and valve passage disk 20, respectively, of valve assembly D, and a valve aperture disk 118 and valve passage disk 124 are designed to replace valve aperture disk 18 and valve passage disk 24, respectively, of valve assembly E in the valve assembly of FIG. 1, and the valve assembly with disks 118 and 120 and 124 will perform in the same manner as the assembly with disks 18, 20 and 24, except that it will operate a twelve adsorber system instead of a two adsorber system. Since valve passage disk 120 has two diametrically opposed feed, exhaust, purge and equalization passages, and valve passage disk 124 has two diametrically opposed product, purge and equalization passages, each adsorption vessel will undergo a complete adsorption cycle every half rotation of the valve passage disks. At any given time in an adsorption process using the valve members of FIGS. 8–12, four vessels will be in the adsorption phase, four will be in the bed regeneration phase and four will be approaching, in or just finished with inlet-to-inletloutlet-to-outlet pressure equalization (depending upon the position of valve passage disks 120 and 124 at the time, and the width of the end portions of equalization passages 152a, 152b, 176a and 176b). In a full rotation of valve passage disks 120 and 124 there will be 24 production stages; accordingly, the adsorption process conducted with disks 118, 120 and 124 will produce a much more continuous flow of product than is produced in the two vessel system illustrated in FIG. 1.

The twelve port embodiment of FIGS. 8–12 has another advantage over the two port embodiment of FIGS. 2–7. Since the various gas streams simultaneously pass through diametrically opposite sides of the valve assemblies when the embodiment of FIGS. 8–12 is used, pressure will be distributed equally on both sides of the valve assembly, and the valve assembly will experience less stress than would be experienced with the FIGS. 2–14 7 embodiment.

Valve passage disk 224, illustrated in FIG. 13, is similar to disk 124, shown in FIG. 11, however end portions 276a, 276b of equalization passages 272a, 272b are significantly wider than end portions 176a, 176b of equalization passages 172a, 172b. Accordingly, end portions 276a, 276b will come into registration with apertures 134 of disk 118 of valve assembly E before end portions 152a, 152b of disk 118 come into registration with apertures 118 of valve assembly D. This will permit outlet-to-outlet equalization of the adsorption vessels in the system to begin before and, if desired, continue after inlet-to-inlet equalization of the vessels. Since this will result in the transfer of more partially fractionated process stream from the outlet end of the vessels being depressurized to the outlet end of the receiving adsorption vessels, this embodiment will reduce double fractionation of the transfer stream, and accordingly be more efficient than the embodiment in which substantially the same amount of partially processed stream is transferred to the receiving vessel through the inlet ports and the outlet ports of the vessels.

A second difference between the construction of disks 224 and 124 is the extended size of arcuate product passages 268a, 268b. In the FIG. 13 embodiment, ports 268a and 268b each have a portion 269a, 269b which extends clockwise beyond the leading edge of passages 144a, 144b (indicated by dotted lines 271a, 271b, respectively) when disk 124 is used in valve assembly D and disk 224 is used in valve assembly E and these disks are aligned so that the straight portions of feed distributor 140 and product collector 264 coincide. Lines 271a and 271b are then in the same radial vector plane from the geometric center of disk 224 as the leading edges (when disks 120 and 224 are rotated clockwise) of arcuate passages 144a and 144b, respectively, of disk 120. The extended portions serve as backfill sections and provide for the flow of product gas, for example from line 92 (FIG. 1), countercurrently into the adsorption vessels that have partially pressurized in the just-completed pressure equalization step, to further pressurize these vessels to near operating adsorption pressure. Arcuate purge passages 270a and 270b are substantially the same as purge passages 170a and 170b, respectively, of FIG. 11. Either or both of the modifications illustrated in FIG. 13 can be incorporated into any of the valve passage disks described herein.

The adsorption vessels used in the system of the invention may be straight elongate vessels or they may be U-shaped or concentric so that, for example, their inlet ends and outlet ends are adjacent or somewhat adjacent each other. Concentric bed vessels have an inner cylindrical adsorbent-packed compartment surrounded by an outer annular adsorbent-packed compartment, the two compartments being of equal cross-sectional area and separated by a cylindrical wall which is sealed to one end of the vessels but does not extend to the other end of the vessels. Each compartment has an opening at the sealed end of the vessel, and fluid that is introduced into one compartment through its opening will pass axially through that compartment in one direction and axially through the other compartment in the opposite direction and leave the other compartment through its opening. A particular advantage of concentric bed adsorption vessels is the potential for heat exchange between the two beds at their feed/outlet ends.

It can be appreciated that the above-described embodiments are merely exemplary of invention and that other embodiments are contemplated. For example, functions of the various parts of the valve passage disks can be inter- changed. For instance, the part designated as feed distributor 140 can function as the exhaust collector, and the parts designated as exhaust passages 146a and 146b can function as feed passages. Similarly, the part designated as product collector 164 can function as the purge distributor and purge passages 170a and 170b can function as product passages. Additionally, flow of the product stream produced in the adsorption process does not have to be controlled by the valve assemblies of the invention. Nor it is not necessary that the purge fluid (if the process includes a purge step) pass through the valve assemblies. The product stream can pass directly from the outlet ends of the adsorption vessels to storage, and purging can be accomplished by inserting an orifice in the product flow line. Both of these alternatives are described in U. S. Pat. Nos. 5,268,021, 5,366,541 and RE 35,099, discussed above.

Furthermore, it may be desirable to connect a vacuum means to vent line 82, shown in FIG. 1, to assist in the adsorbent regeneration step. Vacuum regeneration can be conducted by itself or it can be conducted with the aid of a purge stream, whether or not the purge stream passes through the valve assemblies of the invention.

It will be appreciated that it is within the scope of the present invention to utilize conventional equipment to monitor and automatically regulate the flow of gases within the system so that it can be fully automated to run continuously in an efficient manner.

The invention is further illustrated by the following hypothetical examples in which, unless otherwise indicated, parts, percentages and ratios are on a volume basis.

EXAMPLE 1

A two-vessel adsorption system similar to that illustrated in FIG. 1 is used in this hypothetical example. The valve assemblies used in the system contains the valve members illustrated in FIGS. 2–7 and the adsorption vessels are packed with carbon molecular sieve. This valve assembly provides an adsorption cycle with an inlet-to-inlet/outlet-to-outlet equalization step. The valve assembly is operated at a rate such that the rotatable valve passage disk completes a revolution in about 120 seconds. When air which has been prepurified to remove water vapor and carbon dioxide is compressed to a pressure of about 7.5 bara (bar absolute) and fed into the feed inlet of the system at a temperature of 20° C., 198 Nliters per hour of nitrogen-enriched gas having a purity of 99% will be produced.

EXAMPLE 2

The system illustrated in FIG. 1 is used in this example, except that valve passage disk 24 is replaced with a valve passage disk that has no equalization passage 72, but which is otherwise identical to valve passage disk 24, so that the system will provide only inlet-to-inlet pressure equalization. The valve assembly is again operated at a rate such that the rotatable valve passage disk completes a revolution in about 120 seconds. When air which has been prepurified to remove water vapor and carbon dioxide is compressed to a pressure of about 7.5 bara (bar absolute) and fed into the feed inlet of the system at a temperature of 20° C., 141 Nliters per hour of nitrogen-enriched gas having a purity of 99% will be produced.

A comparison of the above examples shows that when the valve assembly of the invention is used, the nitrogen product flow rate will be about 40% greater than when a valve assembly which provides only inlet-to-inlet pressure equalization is used.

Although the invention has been described with particular reference to specific equipment arrangements and to specific experiments, these features are merely exemplary of the invention and variations are contemplated. For example, U-shaped or concentric adsorption vessels can be used in the adsorption system of the invention. This will enable all conduits to be located at one end of the adsorption vessels, thus rendering the adsorption system more compact. Additionally, valve assemblies D and E can be operated by drive means different from that illustrated in FIG. 1. For instance, the drive motor can be positioned between valve assemblies D and E and arranged such that a drive shaft extends from each end of the drive motor, or separate motors can be used to drive valve assemblies D and E. The scope of the invention is limited only by the breadth of the appended claims.

What is claimed is:

1. A valve system having first and second valve assemblies for providing selective flow communication between conduits of a first set of fluid flow conduits and between conduits of a second set of fluid flow conduits, each valve assembly comprising first and second valve members having respective engaged surfaces relatively rotatable about a common center of rotation to provide valving action, the first valve member of said first valve assembly having a first set of equally spaced through apertures concentrically disposed about the common center of rotation of said first valve assembly with each aperture being in fluid communication with one conduit of said first set of fluid flow conduits and the first valve member of said second valve assembly having a second set of equally spaced through apertures concentrically disposed about the common center of rotation of said second valve assembly with each aperture being in fluid communication with one conduit of said second set of fluid flow conduits, said first and second sets of apertures having the same number of apertures; the second valve member of said first valve assembly having at least one passage means for selectively interconnecting two apertures of said first set of apertures and the second valve member of said second valve assembly having at least one passage means for selectively interconnecting two apertures of said second set of apertures; and drive means for effecting relative rotation of the valve members of each valve assembly to enable rotationally cycled interconnection and fluid flow between one or more pairs of apertures of said first set of apertures and between one or more pairs of apertures of said second set of apertures.

2. The valve system of claim 1, wherein each valve assembly has means for maintaining each first valve member stationary and each second valve member rotatable.

3. The valve system of claim 1, wherein said drive means for maintaining relative rotation of the valve members of said first and second valve assemblies comprises a single drive mechanism.

4. The valve system of claim 1, wherein said first and second sets of apertures have the same even number of apertures.

5. The valve system of claim 1, wherein each set of apertures has two apertures, and the second valve member of said first valve assembly has one passage means for selectively interconnecting the apertures of said first set of apertures and the second valve member of said second valve assembly has one passage means for selectively interconnecting the apertures of said second set of apertures.

6. The valve system of claim 1, wherein each set of apertures has more than two apertures.

7. The valve system of claim 6, wherein said at least one passage means of said first valve assembly has two passages each of which selectively interconnects two apertures of said first set of apertures, and said at least one passage means of said second valve assembly has two passages each of which selectively interconnects two apertures of said second set of apertures.

8. The valve system of claim 7, wherein each set of apertures has a total of 8, 12, 16 or 20 apertures.

9. The valve system of claim 1, wherein said first valve assembly has a feed inlet and an exhaust outlet and said second valve member of said first valve assembly additionally has at least one feed passage means for providing fluid communication between said feed inlet and one or more apertures of said first set of apertures and at least one exhaust passage means for providing fluid communication between one or more apertures of said first set of apertures and said exhaust outlet.

10. The valve system of claim 9, wherein said second valve assembly has a product outlet and the second valve member of said second valve assembly additionally has at least one product passage means for providing fluid communication between one or more apertures of said second set of apertures and said product outlet.

11. The valve system of claim 10, wherein a portion of said product passage means serves as a backfill passage means.

12. The valve system of claim 10, wherein the common centers of rotation of said first and second valve assemblies are axially coincident and each of said at least one feed passage means is located in a radial sector of the second valve member of said first valve assembly, and each product passage of said at least one product passage means is at least partly located in the radial sector from said common center of rotation in which a feed passage of said at least one feed passage means is located.

13. The valve system of claim 9, wherein said second valve assembly has a backfill inlet and the second valve member of said second valve assembly additionally has at least one backfill passage means for providing fluid communication between said backfill inlet and one or more apertures of said second set of apertures.

14. The valve system of claim 9, wherein said second valve assembly has a purge inlet and said second valve member of said second valve assembly additionally has at least one purge passage means for providing fluid communication between said purge inlet and one or more apertures of said second set of apertures.

15. The valve system of claim 14, wherein the common centers of rotation of said first and second valve assemblies are axially coincident and each of said at least one exhaust passage means is located in a radial sector of the second valve member of said first valve assembly, and each purge passage of said at least one purge passage means is located in the radial sector from said common center of rotation in which an exhaust passage of said at least one exhaust passage means is located.

16. The valve system of claim 15, wherein the radial sector defining each purge passage of said at least one purge passage means has a lesser angular extent than the radial sector defining each exhaust passage of said at least one exhaust passage means.

17. The valve system of claim 1, wherein said drive means effects continuous relative motion of the valve members of each valve assembly.

18. The valve system of claim 1, wherein said drive means effects stepwise relative motion of the valve members of each valve assembly.

19. An adsorption system comprising the valve system of claim 1 and an array of adsorption vessels each having a feed inlet end and a product outlet end and containing an adsorbent which preferentially adsorbs one or more fluids of a fluid mixture, wherein each conduit of said first set of fluid flow conduits is connected to the feed inlet end of one vessel of said array of adsorption vessels and each conduit of said second set of fluid flow conduits is connected to the product outlet end of one vessel of said array of adsorption vessels.

20. An adsorption system comprising the valve system of claim 7 and an array of adsorption vessels each having a feed inlet end and a product outlet end and containing an adsorbent which preferentially adsorbs one or more fluids of a fluid mixture, wherein each conduit of said first set of fluid flow conduits is connected to the feed inlet end of one vessel of said array of adsorption vessels and each conduit of said second set of fluid flow conduits is connected to the product outlet end of one vessel of said array of adsorption vessels.

21. The adsorption system of claim 19 or claim 20, wherein each passage means for selectively interconnecting two apertures of said first set of apertures corresponds to a passage means for selectively interconnecting two apertures of said second set of apertures and each pair of corresponding passage means provides fluid communication between the same adsorption vessels.

22. The adsorption system of claim 21, wherein the common centers of rotation of said first and second valve assemblies lie on the same axis and the centers of one of the interconnected apertures of said first set of apertures and one of the interconnected apertures of said second set of apertures are located in the same radial plane from said axis and the centers of the other of the interconnected apertures of said first set of apertures and the other of the interconnected apertures of said second set of apertures are located in the same radial plane from said axis.

23. The adsorption system of claim 19 or claim 20 wherein said first valve assembly has a feed inlet and an exhaust outlet and the second valve member of said first valve assembly additionally has at least one feed passage means for providing fluid communication between said feed inlet and one or more apertures of said first set of apertures, and at least one exhaust passage means for providing fluid communication between one or more apertures of said first set of apertures and said exhaust outlet.

24. The adsorption system of claim 23, wherein said second valve assembly has a product outlet and said second valve member additionally has at least one product passage means for providing fluid communication between one or more apertures of said second set of apertures and said product outlet.

25. The adsorption system of claim 24, wherein the common centers of rotation of said first and second valve assemblies lie on the same axis and each of said at least one feed passage means is located in a radial sector of the second valve member of said first valve assembly, and each product passage of said at least one product passage means is at least partly located in the radial sector in which a feed passage of said at least one feed passage means is located.

26. The adsorption system of claim 24, wherein a portion of each product passage means serves as a backfill passage means.

27. The adsorption system of claim 23, wherein said second valve assembly has a backfill inlet and said second valve member of said second valve assembly additionally has at least one backfill passage means for providing fluid communication between said backfill inlet and one or more apertures of said second set of apertures.

28. The adsorption system of claim 23, wherein said second valve assembly has a purge inlet and said second valve member of said second valve assembly additionally has at least one purge passage means for providing fluid communication between said purge inlet and one or more apertures of said second set of apertures.

29. The adsorption system of claim 28, wherein the common centers of rotation of said first and second valve assemblies lie on the same axis and each of said at least one exhaust passage means is located in a radial sector of the second valve member of said first valve assembly, and each purge passage of said at least one purge passage means is located in the radial sector in which an exhaust passage of said at least one exhaust passage means is located.

30. The adsorption system of claim 29, wherein the radial sector defining each purge passage means has a lesser angular extent than the radial sector defining each exhaust passage means.

31. The adsorption system of claim 19 or claim 20, wherein the passage means of said first and second valve assemblies is constructed so that interconnection of said two apertures of said second set of apertures is effected before interconnection of said two apertures of said first set of apertures is effected.

32. The adsorption system of claim 19 or claim 20, wherein said adsorption vessels are U-shaped or concentric.

33. A process comprising introducing into said feed inlet of the adsorption system of claim 23, while said second valve members of said first and second valve assemblies are in relative rotation, a fluid mixture which contains at least one component which is preferentially adsorbed by said adsorbent relative to at least one other component of said fluid mixture, while withdrawing through said product outlet fluid enriched in said at least one other component, and withdrawing from said exhaust outlet fluid enriched in said at least one component and providing inlet-to-inlet/outlet-to-outlet equalization between selected vessels of the system.

34. The process of claim 33, wherein said fluid mixture is a gaseous mixture.

35. The process of claim 34, wherein said gaseous mixture is air.

36. The process of claim 35 wherein said at least one component is oxygen and said at least one other component is nitrogen.

37. The process of claim 35, wherein said at least one component is nitrogen and said at least one other component is oxygen.

* * * * *